(12) United States Patent  
Szummer

(10) Patent No.: US 7,512,273 B2
(45) Date of Patent: Mar. 31, 2009

(54) DIGITAL INK LABELING

(75) Inventor: Martin Szummer, Chesterton (GB)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 11/256,263

(22) Filed: Oct. 21, 2005

(65) Prior Publication Data

US 2006/0098871 A1    May 11, 2006

Related U.S. Application Data

(60) Provisional application No. 60/621,250, filed on Oct. 21, 2004.

(51) Int. Cl.
*G06K 9/00*    (2006.01)

(52) U.S. Cl. .................. 382/187; 382/163; 382/167; 358/502; 358/518

(58) Field of Classification Search ................. 382/163, 382/164, 167, 187
See application file for complete search history.

(56) References Cited

U.S. PATENT DOCUMENTS 5,271,710 A * 12/1993 Decharran et al. ....... 414/798.9
5,444,797 A * 8/1995 Spitz et al. ................. 382/192
5,827,141 A * 10/1998 Lukey et al. ............... 473/563
5,847,712 A * 12/1998 Salesin et al. ............... 345/582
5,857,251 A * 1/1999 Schwarzenberger ......... 29/33 P

OTHER PUBLICATIONS

Szummer, et al., "Contextual Recognition of Hand-Drawn Diagrams with Conditional Random Fields", IEEE Computer Society, 2004, pp. 32-37.
Cowans, et al., "A Graphical Model for Simultaneous Partitioning and Labeling", Microsoft Research Publication, Jan. 2005.
Szummer, "Learning Diagram Parts with Hidden Random Fields", Microsoft Research Publication, Aug. 2005.
Szummer, et al., "Incorporating Context and User Feedback in Pen-Based Interfaces", Microsoft Research Publication, Oct. 2004.

* cited by examiner

*Primary Examiner*—Yosef Kassa

(57) ABSTRACT

Digital ink strokes may be fragmented to form a training data set. A neighborhood graph may be formed as a plurality of connected nodes. Relevant features of the training data may be determined in each fragment such as local site features, interaction features, and/or part-label interaction features. Using a conditional random field which may include a hidden random field modeling parameters may be developed to provide a training model to determine a posterior probability of the labels given observed data. In this manner, the training model may be used to predict a label for an observed ink stroke. The modeling parameters may be learned from only a portion of the set of ink strokes in an unsupervised way. For example, many compound objects may include compositional parts. In some cases, appropriate compositional parts may be discovered or inferred during training of the model based on the training data.

20 Claims, 8 Drawing Sheets

DIGITAL INK LABELING

CROSS REFERENCE TO RELATED APPLICATIONS

This application claims the benefit of U.S. Provisional Patent Application No. 60/621,250, filed Oct. 21, 2004, titled JOINT GROUPING AND LABELING, which is incorporated by reference herein.

BACKGROUND

MRFs model the joint distribution, i.e., p(y,x), over both the observed image data x and the image fragment labels y. However, if the ultimate goal is to obtain the conditional distribution of the image fragment labels given the observed image data, i.e., p(y|x), then conditional random fields ("CRFs") may model the conditional distribution directly. Conditional on the observed data x, the distribution of the labels y may be described by an undirected graph. From the Hammersley-Clifford Theorem and provided that the conditional probability of the labels y given the observed data x is greater than 0, then the distribution of the posterior probability of the labels given the observed data P(y|x) may factorize according to the following equation:

$$P(y|x) = \frac{1}{Z(x)} \tilde{O}_c Y_c(y_c, x) \quad (1)$$

The product of the above equation runs over all connected subsets c of nodes in the graph, with corresponding label variables denoted $y_c$ associated with observed data denoted x, and a normalization constant denoted Z(x) which is often called the partition function.

Markov random fields ("MRFs") have been used to model spatial distributions such as those arising in image analysis. For example, patches or fragments of an image may be labeled with a label y based on the observed data x of the patch.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Conditional random fields model the probability distribution over the labels given the observational data. CRFs model dependencies between the data and its labels, as well as dependencies between labels. However, they do not model the distribution over the data itself, and merely condition on it. In this manner, CRFs provide a joint distribution over the labels conditioned on the data.

To implement CRFs for ink stroke object recognition or labeling, data, such as a digital ink strokes that make up a drawing or note, may be fragmented to form a training data set of data. Electronic ink is a sequence of one or more ink strokes with properties that are captured by an electromagnetic pen digitizer or may be a bit map of a scanned image, and the like. A sequence of ink strokes may include strokes in an ordered form. The sequence may be ordered by the time captured or by where the strokes appear on a page or document. Other orders are possible. A set of strokes may include sequences of strokes or unordered strokes or any combination thereof. An ink stroke is a piece of electronic ink made by one pen stroke. Each pen stroke may begin with a pen-down event and may end with a pen-up event. One ink stroke may span multiple objects, since the user can draw multiple objects without lifting the pen. A fragment of the ink strokes may be any portion or combination of one or more ink strokes such as parts of strokes, whole strokes, or multiple grouped strokes of observational data. For example, a fragment may be a line segment which is straight to within a given tolerance, single ink dots, pixels, arcs, and other low-level objects.

A neighborhood graph may be formed as a plurality of connected nodes, with each node representing a fragment. Relevant features of the training data may be detected and/or determined in each fragment. Local site features of a single node may be determined and interaction features of multiple nodes may be determined. Features of the training and/or observed data may be any suitable feature or characteristic of a portion or combination of ink strokes such as length and/or orientation of a fragment; relative distance, relative angle and relative time of formation between fragments; corners; junctions; color and/or thickness of pen used; and the like.

The labels associated with each fragment node of the training data set are known, and presented to a training engine with the associated training data set of the training ink strokes. Using a conditional random field, the training engine may develop a set of modeling parameters, which may be used to develop a training model to determine a posterior probability of the labels y given the observed data set x. In this manner, the training model may be used to predict a posterior label probability distribution for a fragment i with the observed data $x_i$ in an observed set of ink strokes to be labeled.

The training engine may learn the modeling parameters based on only a portion of the set of ink strokes in an unsupervised way. For example, many diagrams contain compound objects (e.g., multiple ink strokes) composed of compositional parts. In some cases, the compositional parts may be labeled by the user, and in other cases, the appropriate compositional parts may be discovered during training of the model based on the training data. In the latter case, the training model may require training labels only for compound objects of the observed data x. For example, a coarse label for the fragment or object (e.g., an arrow) may be labeled by the user in the training data. Fine-grained labels of the compositional parts of each fragment (e.g., an arrow feature may be composed of an arrow-head compositional part and a stem compositional part) may not be required to be labeled by the user in the training data and may be discovered during the training process. In this manner, human effort to label training data may be reduced and compositional parts of compound objects are not manually specified a priori. Instead appropriate compositional parts are discovered automatically based on the data. Contextual relations between compositional parts may be included in the training model such that the label of a fragment of observed data can depend simultaneously on the labels of its neighboring nodes, as well as spatial and temporal information. The contextual relations may be modeled in any suitable manner, which may include a Hidden Random Field (HRF), which is an extension of a Conditional Random Field. The HRF model may improve recognition accuracy further over the Conditional random field, which did not simultaneously model both compound objects and compositional parts.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a labeling system for ink strokes, the labeling system for ink strokes described is provided as an example and not a limitation. As those skilled in the art will appreciate, the present examples are suitable for application in a variety of different types of labeling systems for any suitable training and/or observed data including digital images, and the like. Although the examples below refer to diagram labels such as containers, box, arrows, and the like, it is to be appreciated that any suitable labels may be used, such as object identifiers, symbol and text character identifiers, and the like.

Example Operating Environment

Figure 1:
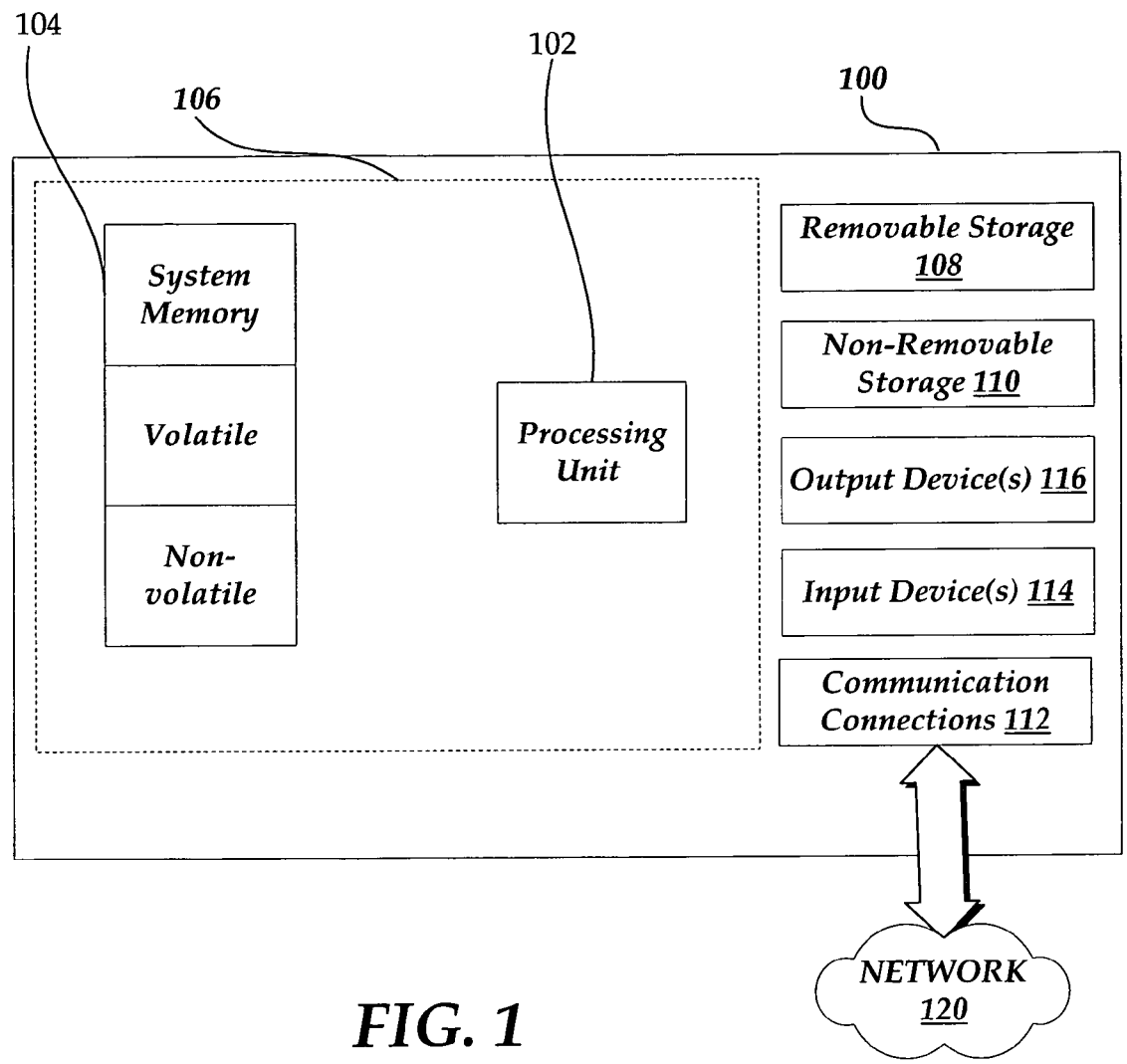
FIG. 1 is an example computing system for implementing a labeling system of FIG. 2.

FIG. 1 and the following discussion are intended to provide a brief, general description of a suitable computing environment in which a labeling system for ink strokes may be implemented. The operating environment of FIG. 1 is only one example of a suitable operating environment and is not intended to suggest any limitation as to the scope of use or functionality of the operating environment. Other well known computing systems, environments, and/or configurations that may be suitable for use with a labeling system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the labeling system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing the labeling system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 100 may also contain communication connection(s) 112 that allow the device 100 to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, cellular phone, radio frequency, infrared, and other wireless media. The term computer readable media as used herein includes both storage media and communication media.

Device 100 may also have input device(s) 114 such as keyboard, mouse, pen, voice input device, touch input device, and/or any other input device. Output device(s) 116 such as display, speakers, printer, and/or any other output device may also be included.

Figure 2:
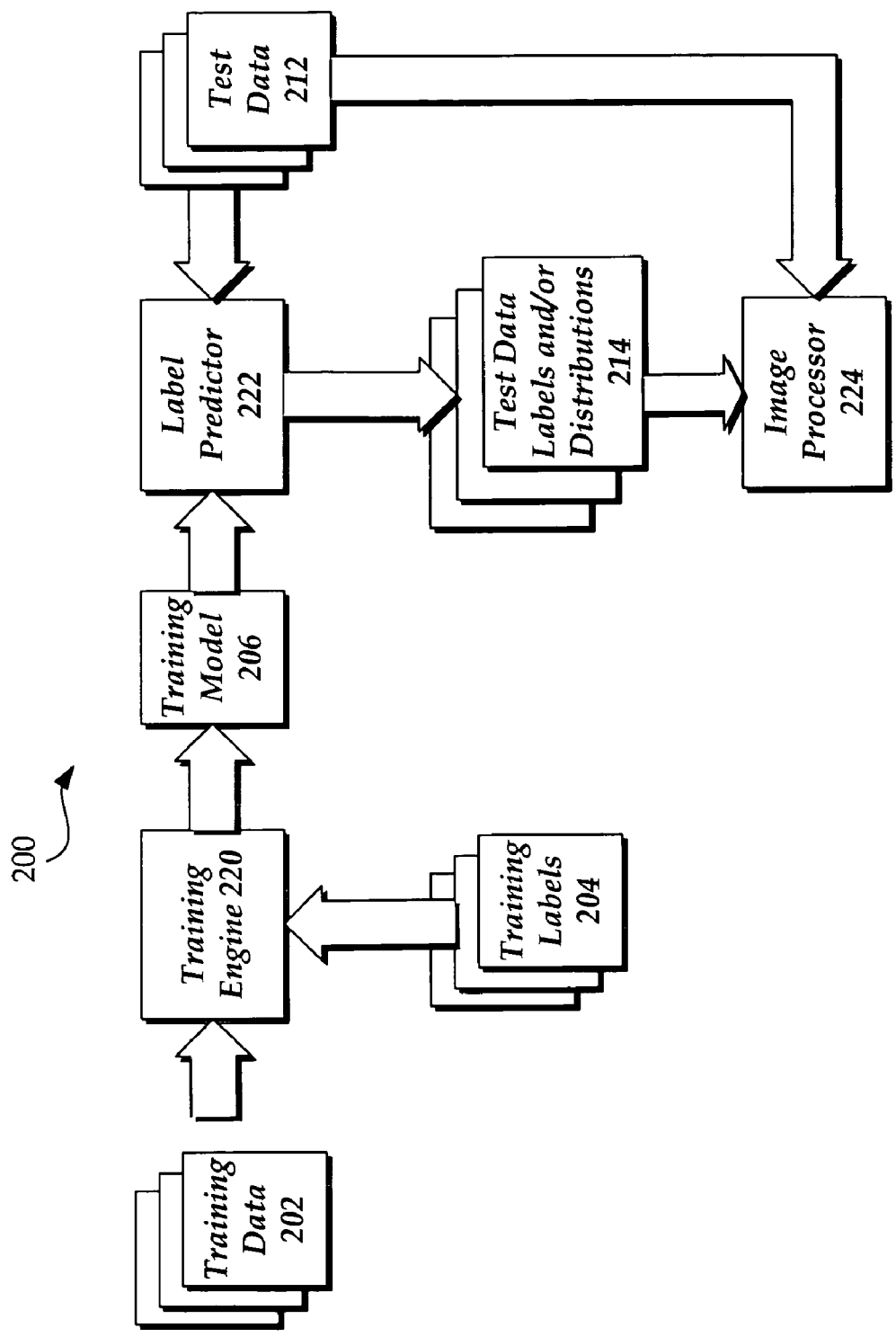
FIG. 2 is a dataflow diagram of an example labeling system.

FIG. 2 illustrates a labeling system 200 for labeling digital images, such as ink strokes, within the computing environment of FIG. 1. Labeling system 200 comprises a training engine 220 and a label predictor 222. The training engine 220 may receive training data 202 and their corresponding training labels 204 to generate a training model 206. A label predictor 222 may use the generated training model 206 to predict data labels 214 for observed data 212. Although FIG. 2 shows the training engine 220 and the label predictor 222 in the same labeling system 200, they may be supported by separate computing devices 100 of FIG. 1.

The training data 202 may include one or more ink strokes which may be included in one or more electronic documents such as a drawing, note, page and the like. For example, the training data may include one or multiple items such as pages, with each item including a set of digital ink strokes forming text and/or drawings; images of the drawings; images of diagrams; notes and general documents; and the like. The training data may include or indicate any other ink stroke feature of the set of ink strokes such as a visual feature (e.g., color, line thickness, length, orientation, intersection or junction, connectivity, relative proximity, and the like); temporal features (e.g., relative temporal creation); or any other suitable feature data. The feature data may be determined from the training data itself and/or may be captured by the digital pen software or hardware, e.g., temporal creation, and associated with the ink stroke data such as with meta-data. It is to be appreciated that any type of data having a suitable amount of spatial structure may be used as training data 202 as appropriate for the resulting training model 206 which may be used to predict label distributions 214 for data 212. In one example, the input may be electronic ink recorded as sampled locations on the pen, and collected into strokes separated by pen-down and pen-up events.

Each ink stroke or grouping of ink strokes may be fragmented or grouped into one or more training fragments. In this manner, a training fragment may contain a portion of or combination of one or more ink strokes of the training data 202. In some cases, a portion of an ink stroke, e.g., a linear portion of an input line, may form a fragment. In other cases, a combination of ink strokes, e.g., four ink strokes forming a box, may form another fragment. The training fragments may be determined in any suitable manner. For example, a user may manually combine or partition one or more ink strokes of the training data 202 to form a fragment. Additionally or alternatively, the training engine 220 of FIG. 2 may automatically fragment a portion of the training data 202 and present the fragmented data to a user to be associated with training labels 204. For example, the ink fragments may be small enough to belong to a single label, e.g., a container or connector. Thus, in many applications, fragments may typically be some portion of a single ink stroke. However, in other cases, a single ink stroke may span more than one shape or label, for example, when a user draws a container and a connector without lifting the pen. Accordingly, such an ink stroke spanning multiple labels may be fragmented. In some cases, where the available labels is container and connector, the fragments may be chosen to be groups of ink dots within a stroke that form a straight line segment within some tolerance.

The one or more portions of ink strokes may be associated with a particular fragment in any suitable manner. For example, one or more portions of the training ink strokes (or any suitable representation thereof) may be associated with a fragment identifier or may be associated with the training data as meta-data. The association between the training data and fragments may be stored in any suitable manner such as in a data store. The data store may be implemented in the computing device of FIG. 1 in any combination of system memory 104, storage 108, storage 110, and the like, as appropriate.

The training labels 204 identify the appropriate label or descriptor for each training fragment in the training data 202. In this manner, the training data may include one or more training fragments, each with an associated training label. The available training labels identify the class or category of a fragment or a group of fragments. The associated labels 204 may identify particular fragments of the drawings, such as objects, e.g. rectangles, ellipses, connectors, arrows, and other shapes; text characters and/or symbols, and the like. The labels associated with the data may be any suitable labels to be associated with the data, and may be represented by, without limitation, character text and/or symbol identifiers, organization chart box and/or connector identifiers, friend and foe identifiers, object identifiers, and the like. The available set of labels may be application specific. For example, in an organization chart example, the available labels for fragments within the data may be identified as either a container (e.g., box) or a connector, such as a connecting line or arrow. Although the below examples are described with reference to a two-dimensional labeling problem, i.e., binary label choices, it is to be appreciated that two or more labels may be included in the set of labels.

It is to be appreciated that any suitable data store in any suitable format may be used to store and/or communicate the training data and associated labels and/or fragments, and the like, including a relational database, object-oriented database, unstructured database, an in-memory database, or other data store. A storage array may be constructed using a flat file system such as ASCII text, a binary file, data transmitted across a communication network, or any other file system. Notwithstanding these possible implementations of the foregoing data stores, the term data store and storage array as used herein refer to any data that is collected and stored in any manner accessible by a computing device.

The observed data 212 to be labeled may be of the same type of digital ink or image or different type of ink or image than the training data 202; however, the data labels 214 determined by the label predictor 222 are selected from the available training labels 204. Although the following description is made with reference to ink strokes illustrating objects which may be geometric objects and shapes, it is to be appreciated that the training data, observed data and/or associated labels may be any suitable data and/or label as appropriate, and that the labels may include two or more labels.

As noted above, the label predictor 222 may receive observed data 212. If the training data 202 was fragmented, the observed data 212 may be fragmented in a similar manner. Alternatively, the training model 206 may include learned and/or predetermined functions which automatically fragment the observed data. The label predictor 222 may determine the observed labels and/or observed data label distributions 214.

The determined labels and/or distributions may be associated with the observed data in any suitable manner. For example, the observed data 212 and associated labels and/or distributions may be stored in a data store similar to or different from the data store storing any fragment data associated with the training data.

Additionally or alternatively, the determined labels and/or distributions may be processed by an image processor 224 of FIG. 2 present the labels and/or distributions or a representation thereof to a user, such as through a display device. In some cases, the determined labels and/or distributions may be used to annotate the displayed observed data on the display device, e.g., a drawn arrow may have a visual indicator identifying the object as an arrow. The visual indicator may allow interaction with the user, such as allow the user to accept or reject the determined label. In other cases, the determined labels or distributions may be used to modify the observed data. For example, a set of one or more ink strokes may be identified with a label as a particular object, and in response, the image processor may convert the ink strokes into a computer generated object, such as optical character recognition, converting a drawn box and connector into a drawing palette box of the correct dimensions and associated connecter. It is to be appreciated that the labeled observed data may be used and/or modified in any suitable manner based on the determined labels.

Figure 3:
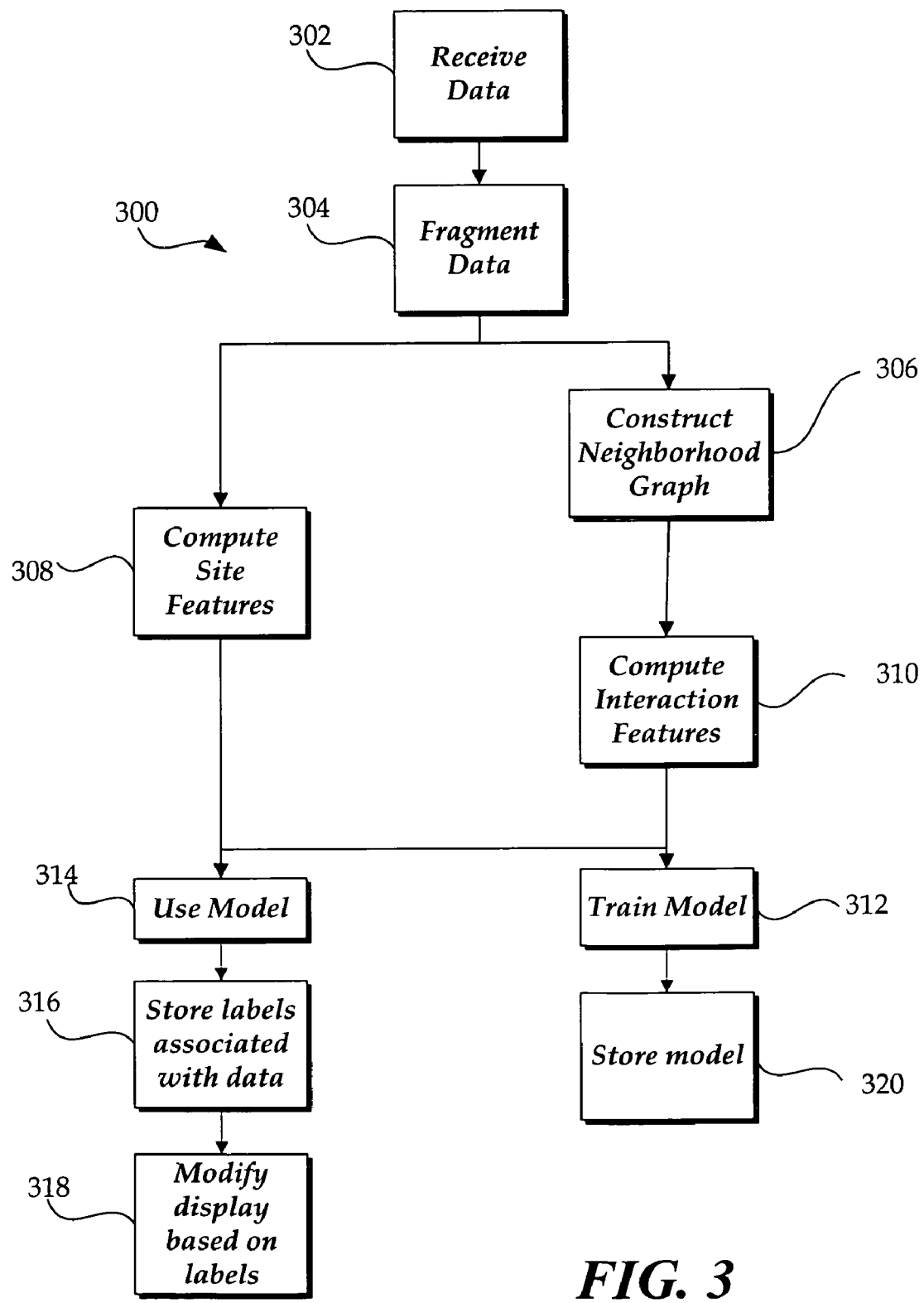
FIG. 3 is a flow chart of an example method of training labels for ink strokes.

One example method 300 of generating and using the training model 206 of FIG. 2 is illustrated in FIG. 3 with reference to the example labeling system of FIG. 2. Initially, the training data 202 may be received 302, such as by the training engine 220. The training data may be formatted and/or modified as appropriate for use by the training engine. For example, a hand-drawn diagram or drawing may be digitized.

The training data 202 may be fragmented 304 using any suitable method, which may be application specific, to form a plurality of fragments. For example, with respect to digital ink, the ink strokes may be divided into simpler components based on line segments which may be straight to within a given tolerance, single dots of ink, pixels, arcs, or other objects. In one example, the choice of fragments as approximately straight line segments may be selected by applying a recursive algorithm which may break a stroke at the point of maximum deviation from a straight line between the endpoints, and may stop recursing and form a fragment when the deviation is less than some tolerance. Another example of fragments may be spatially distributed bitmaps of the image, which may be co-extensive or spaced. Moreover, the image fragments may be of the same shape and/or size, or may differ as suitable to the fragments selected.

Based upon the fragments of the training data, an undirected graph for each training item, e.g., document, page, paragraph, line, region, and the like, may be constructed 306 using any suitable method. Each graph may contain one or more nodes and zero or more edges connecting two or more nodes. Each graph associated with a training item may be independent of the graphs of the other items in the training data. However, in some cases, the graphs of several items may have the same or similar structure and be connected, so that the nodes of all training items may be evaluated together and inferences drawn from other training items in the training data.

The undirected graph may define two-dimensional recognition problems to which may be applied conditional random fields. In some cases, such as when the graph is sparse as described further below, the conditional random field may be applied without necessitating approximations, such as pseudo likelihood or other approximations. For example, a node for each fragment of the training data may be constructed, and edges added between the nodes whose relation is to be modeled in the training model 206. Example criteria for edge creation between nodes may include connecting a node to a predetermined number of neighboring nodes based on shortest spatial distance, membership of a minimum spanning tree, co-extensive edges or vertices of fragments, and the like; connecting a node to other nodes lying within a predetermined distance; and/or connecting a node to all other nodes; and the like. In this manner, each node may indicate a fragment to be classified by the labels y, and the edges between nodes may indicate dependencies between the labels of pairwise nodes connected by an edge.

A clique may be defined as a set of nodes which form a subgraph that is complete, i.e., fully connected by edges, and maximal, i.e., no more nodes can be added without losing completeness. For example, a clique may not exist as a subset of another clique. In an acyclic graph (i.e., a tree), the cliques may comprise the pairs of nodes connected by edges, and any individual isolated nodes not connected to another node. In some cases, the neighborhood graph may be triangulated. For example, edges may be added to the graph such that every cycle of length more than three has a chord.

The undirected graph may be formed in a way such that it is sparse, i.e., it has low induced treewidth. To ensure that the graph is sparse, only nodes within a small spatial distance are connected. A small spatial distance may be an absolute distance such as 5 millimeters, or it may be a relative distance to the k-nearest strokes, where k may be 5. Additional heuristics to prune the graph may be used, such as pruning edges of nodes with high degree, or pruning all edges not in the minimum spanning tree, or schemes that approximate high treewidth graphs by low treewidth graphs, e.g. Narasimhan, M & Bilmes J "Optimal sub-graphical models", Neural information processing, vol. 17, 2005, p. 961-968, L. K. Saul, Y. Weiss and L. Bottou (eds), MIT Press Cambridge Mass., incorporated by reference herein. The sparsity of the graph means that any cliques added by triangulation may still be efficiently processed.

Nodes in the undirected graph may be denoted by indices i and j, and edges may be denoted by the indices ij indicating the nodes connected by the edge. A single observed ink fragment at node i may be denoted by $x_i$, and a plurality of data fragments may be denoted by the vector x. Each node i of the graph may be associated with a label which may be denoted by $y_i$ and the label for a plurality of fragments may be denoted by y.

Figure 4:
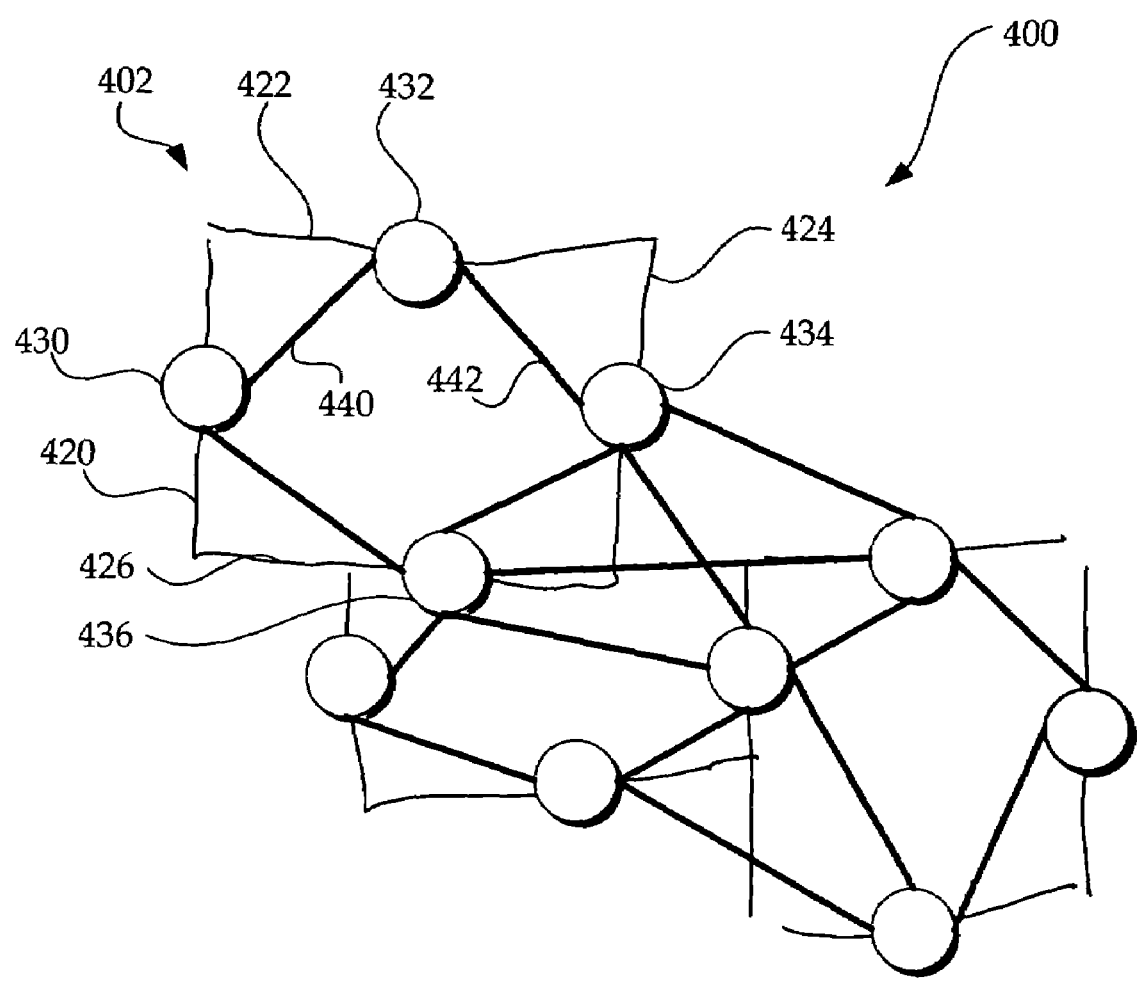
FIG. 4 is a diagram of an example conditional random field graph superimposed over an example set of ink stroke input.

An example conditional random field graph 400 is illustrated in FIG. 4 superimposed over example training fragments. The graph 400 includes nodes and edges with each node being associated with a single fragment. For example, the container 402 comprises four fragments 420, 422, 424, 426, each being respectively associated with nodes 430, 432, 434, 436, despite the container being provided with a single ink stroke (e.g., one pen-down and pen-up event). Nodes may be independent, or may be connected with edges. Example edges 440, 442 are shown in FIG. 4 connecting nodes 430, 432 and nodes 432, 434 respectively. Each edge may indicate interaction potentials between neighboring fragments. The interaction potentials or edges of the graph indicate how compatible labels with neighboring labels of connected nodes, i.e., whether connected nodes associated with fragments prefer the same or different labels.

In conditional random fields, each label $y_i$ is conditioned on the whole of the observation data x. The global conditioning of the labels allows flexible features that may capture long-distance dependencies between nodes, arbitrary correlation, and any suitable aspect of the data. For example, various features may be calculated and represented as potentials of the random field. During the training process, the CRF algorithm may then learn which features or combination of features are discriminative for the task.

One or more site features of each node (i.e., fragment) of the training data 202 may be computed 308. Site features may indicate how compatible labels are with the underlying ink fragment. Site features of the node may be one or more characteristics for the training data fragment that may distinguish the fragments from each other and/or may discriminate between the available labels for each fragment. The site features may be based on observations in a local neighborhood, or alternatively may be dependent on global properties of all observed ink strokes in a particular training item, in all of the training data, and/or other data x. A feature may be a binary value, an integer, a real number, a vector of values, a histogram of values, or any other numerical representation of a measurement. For example, the site features of a set of ink strokes may include any one or combination of lengths of stroke fragments, orientations, angles between ink strokes, corners, T-junctions and other junctions, simple shape detectors, overstrike and hook information, temporal formation, proximity, object identifiers, and the like.

In one example length and orientation angle of the fragment may be determined and encoded as site potentials. To consider the context of a single fragment, a histogram of distances and relative angles to neighboring fragments may be calculated, and used as vector-valued site features.

In one example, each site feature to be considered may be computed with one or more site feature functions. Site features which are local independent features may be indicated as a fixed, non-linear function dependent on the training data x, and may be indicated as a site function vector $g_i(x)$, where i indicates the node and each element of the function vector $g_i(x)$ indicates a separate site feature to be considered.

The site feature function may be applied to the training data x to determine the feature(s) of a fragment i. A site feature function g may be chosen for each node to determine features which help determine the label y for that fragment, e.g. a short length may indicate that a fragment is part of a connector rather than a container.

One or more interaction features of each connection edge of the graph between pairwise nodes of the training data 202 may be computed 310. The interaction features may indicate how compatible labels are with neighboring nodes. Interaction features of an edge may be one or more characteristics based on both nodes and/or global properties of the training data x. The interaction features may indicate a correlation between the labels for the pairwise nodes. For example, the interaction feature of a set of ink strokes may include relative distance, relative angle, relative color or pen thickness of a site feature of one node relative to another site feature of another pairwise node, connection and/or continuation of a site feature of one node to a pairwise node, relative temporal creation of a site feature of a node relative to another pairwise node, and the like. The site and/or interaction features may be at least a portion of the test data or may be function of the test data.

In one example, the interaction features may include the distance and angle between the fragments, and temporal features such as whether the pen was lifted in between formation of the fragments. Template features may be included that detect perceptual relations. For example, domain-knowledge or application specific knowledge may be employed to capture parts of organization charts, such as employing a basic corner and/or T-junction feature, a container-side feature that checks whether corners are present on both ends of a fragment, and an alignment measurement of whether two fragments are parallel and aligned. Some of these features may yield a real number value, but many may be binary or fall into a multiple member class. A bias feature may be included, and may be set to one. It is to be appreciated that other features may be employed as appropriate for the label class and/or application.

In one example, the interaction features may be computed with an interaction feature function. Interaction features between a pair of nodes may be indicated as a fixed function dependent on the training data x, and may be indicated as an interaction function vector $f_{ij}(x)$, where i and j indicate the nodes being paired and each element of the function vector $f_{ij}(x)$ indicates a separate interaction feature to be considered. The interaction feature function may be applied to the training data x to determine the feature(s) of an edge connecting the pairwise nodes. Although the description below is directed to pairing two nodes (i.e., nodes i and j), it is to be appreciated that two or more nodes may be paired or connected to indicate interaction between the nodes. An interaction feature function f may be chosen for each edge of the graph connecting nodes i and j to compute features which help determine that the label y should be the same for both nodes or should be related in some way.

The site feature function g and interaction feature function f may be any appropriate function(s) of the training data and the training data. For example, the K-nearest neighbors of a fragment may be determined, and the angles to all of the neighboring nodes may be accumulated into a histogram. The interaction feature function f may be a concatenation of the site features of the pairwise nodes i and j. This feature may reveal whether or not the pairwise nodes exhibit the same direction in their dominant edges, such as arising from a line that has been fragmented into two co-linear fragments i and j.

The site and interaction feature functions g and/or f may be linear or nonlinear. In one example, the site and/or interaction feature functions may be implemented within the training engine 220 of FIG. 2 and/or label predictor 222. The training model 206 may provide a function indicator indicating which one or more site and/or interaction functions are associated with the node. In another example, the site and/or interaction feature functions may be implemented within the training engine and provided to the label predictor 222 through the training model 206. It is to be appreciated that any suitable method of associating a function with a node and communicating the function and association to the label predictor may be used. The site and/or interaction functions may be implemented by any suitable set of executable instructions such as a computer program.

In one example, a site feature function g may be selected as part of the learning process and a training model may be determined and tested to determine if the selected function is appropriate. Alternatively, heuristics or any other appropriate method may be used to select the appropriate site feature function g and/or the interaction feature function f. As noted above, each element of the site feature function vector g and the interaction feature function vector f for a particular pair of nodes represents a particular function, which may be the same as or different from other functions with each function vector.

The site features may be used to apply a site feature classifier independently to each node i and assign a label probability. In a conditional random field with no interactions between the nodes (e.g., no edges), the conditional label probability of the training model may be developed using the following equation:

$$P_i(y_i|x, w) = \frac{1}{Z(w)} \psi(y_i w^T g_i(x)) \qquad (2)$$

In the example of Equation (2), the site feature vector $g_i$ is weighted by a site modeling parameter vector w, and then fed through a non-linearity function $\psi$ and normalized to sum to 1 with a partition function Z(w). The non-linearity function $\psi$ may be any appropriate function such as an exponential to obtain a logistic classifier, a probit function which is the cumulative distribution of a Gaussian, and the like.

Ink stroke fragments of the training data and/or observed data may be similar to one another, and accordingly, contextual information may be used, i.e., the edges indicating a correlation or dependency between the labels of pairwise nodes may be considered. For example, if a first node has a particular label, a neighboring node and/or node which contains a continuation of a feature from the first node may have the same label as the first node. In this manner, the spatial relationships of the nodes may be captured. To capture the spatial relationships, a joint probabilistic model may be incorporated into the training module 206 to be considered by the label predictor 222 so the grouping and label of one node may be dependent on the grouping and labeling of the rest of the graph.

To capture spatial relationships of nodes, the Hammersley-Clifford theorem shows that the conditional random field conditional distribution p(y|x) can be written as a normalized product of potential functions on complete sub-graphs or cliques of the graph of nodes. To capture the pairwise dependencies along with the independent site classification, two types of potentials may be used: a site potential $A(y_i, x; w)$ which measures the compatibility of a label with the fragment, and an interaction potential $I(y_{ij}, x; v)$ which measures the compatibility between labels of pairwise nodes. The interaction modeling parameter vector v, like the site modeling parameter vector w, weights the training and observed data x, i.e., the interaction feature vector $f_{ij}(x)$. A high positive component value for a weight $w_k$ and/or $v_k$ may indicate that the associated feature (site feature component $(g_i)_k$ and/or interaction feature $(f_{ij})_k$, respectively) has a high positive influence. Conversely, a value of zero for a weight $w_k$ and/or $v_k$ may indicate that the associated site feature $(g_i)_k$ and/or interaction feature $(f_{ij})_k$ is irrelevant to the site or interaction potential, respectively.

A site potential $A_i$ for a particular node may be constructed during model training based on the label for a particular node, data x of one or more training items, and the site modeling parameter vector w. The site potential may be indicated as $A_i(y_i, x; w)$ where $y_i$ is the label for a particular node i and x is the training data. In this manner, the site potential may model the label for one fragment based upon the features for all fragments which may be weighted by the site modeling parameters w.

An interaction potential $I_{ij}$ may be constructed based on the labels of two or more associated nodes, data x of one or more entire pages or documents, and the interaction modeling parameter vector v. Although the following description is with reference to interaction potentials based on two pairwise nodes, it is to be appreciated that two or more nodes may be used as a basis for the interaction potential, although there may be an increase in complexity of the notation and computation. The interaction potential I that may be associated with edge ij may be indicated as $I_{ij}(y_i, y_j, x; v)$ where $y_i$ is the label for a first node i, $y_j$ is the label for a second node j, and x is the training data. In this manner, the interaction potential may model the labels for neighboring nodes based upon the features for all fragments which may be weighted by the interaction modeling parameters v.

In some cases, it may appropriate to assume that the model is homogeneous and isotropic, i.e., that the site potential and the interaction potential are taken to be independent of the indices i and j. In some cases, no restrictions may be placed on the relations between site features of nodes, e.g., $g_i(x)$ and $g_j(x)$, for different sites i and j, nor on the interaction features. For example, features can overlap, be strongly correlated, and/or extend over long distances.

A functional form of conditional random fields may use the site potential and the interaction potential to determine the conditional probability of a label given observed data p(y|x) to form the training model. By combining the site and interaction potentials, the conditional random field may work as a network of coupled classifiers or labelers, where each site potential acts like a classifier predicting the label at one node of the graph and the predictions are then coupled by classifiers based on interaction potentials. For example, the conditional distribution of the labels given the observed data may be written as:

$$P(y|x) = \frac{1}{Z(w, v, x)} \left( \prod_{i \in V} A_i(y_i, x; w) \prod_{(i,j) \in E} I_{ij}(y_i, y_j, x; v) \right) \qquad (3)$$

where the variable i indicates each node, and the pair (i, j) indicates the pairwise or connected node indices corresponding to the paired nodes of i and j in the undirected graph. The function Z is a normalization constant known as the partition function, similar to that described above with reference to Equation (2). The partition function may be determined using:

$$Z(w, v, x) = \sum_{y} \left( \prod_{i} A_i(y_i, x; w) \prod_{(i,j)} I_{ij}(y_i < y_j, x; v) \right)$$

The site potential A may be parameterized with the weighting parameters w discussed above with reference to Equation (2). The site potential may be parameterized as a function:

$$A_i(y_i, x; w) = \psi(y_i w^T g_i(x)) \qquad (4)$$

where $g_i(x)$ is a vector of features determined by the site feature function g based on the training data x. The basis or site feature function g may allow the classification boundary to be non-linear in the original features. The parameter $y_i$ is the known training label for the node i, and w is the site modeling parameter vector. As in generalized linear models, the function $\psi$ can be an exponential or logistic function, a probit function, or any suitable function. In one example, the non-linear function $\psi$ may be constructed as an exponential function leading to a site potential of $$A_i(y_i, x; w) = \exp(y_i w^T g_i(x)) \qquad (5)$$

In another example, the non-linear function $\psi$ may be constructed as a logistic function leading to a site potential of $$A_i(y_i, x; w) = \exp[\ln \sigma(y_i w^T g_i(x))] \qquad (6)$$

where $\sigma(\cdot)$ is a logistic sigmoid function, and the site modeling parameter vector w is an adjustable parameter of the model to be determined during learning. The logistic sigmoid function $\sigma$ is defined by:

$$\sigma(a) = \frac{1}{1+\exp(-a)} \quad (7)$$

The interaction potential I may be parameterized with the weighting parameters v discussed above. The interaction potential I may be parameterized as a function:

$$I_{ij}(y_i, y_j, x) = \exp[y_i y_j v^T f_{ij}(x)] \quad (8)$$

where $f_{ij}(x)$ is a vector of features determined by the interaction function f based on the training data x; $y_i$ is the known training label for the node i; $y_j$ is the known training label for the node j; and the interaction modeling parameter vector v is an adjustable parameter of the model to be determined in training.

In some cases, it may be appropriate to define the site potential A and/or the interaction potential I to admit the possibility of errors in labels and/or measurements. Accordingly, a labeling error rate $\in$ may be included in the site potential and/or the interaction potential I. In this manner, the site potential may be constructed as:

$$A_i(y_i, x; w) = (1-\in)\psi(y_i w^T g_i(x)) + \in(1-\psi(y_i w^T g_i(x))) \quad (9)$$

where w is the site modeling parameter vector, and $\psi(y)$ is an exponential, the cumulative distribution for a Gaussian with mean of zero and a variance one, or any other suitable nonlinear function. The parameter $\in$ is the labeling error rate and $g_i(x)$ is the feature extracted at node i of the conditional random field. In some cases, it may be appropriate to place no restrictions on the relation between features $g_i(x)$ and $g_j(x)$ at different sites i and j. For example, features can overlap nodes and be strongly correlated.

Similarly, a labeling error rate may be added to the interaction potential I, and constructed as:

$$I_{ij}(y_i, y_j, x; v) = (1-\in)\psi(y_i y_j v^T f_{ij}(x)) + \in(1-\psi(y_i y_j v^T f_{ij}(x))) \quad (10)$$

The parameterized models may be described with reference to a two-state model, for which the two available labels $y_1$ and $y_2$ for a fragment may be indicated in binary form, i.e., the label y is an either 1 or −1. The exponential of a linear function of $y_i$ being 1 or −1 is equivalent to the logistic sigmoid of that function. In this manner, the conditional random field model for the distribution of the labels given observation data may be simplified and have explicit dependencies on the parameters w and v as shown:

$$p(y|x, w, v) = \frac{1}{\tilde{Z}(w, v, x)} \exp\left(\sum_{i \in V} y_i w^T g_i(x) + \sum_{(i,j) \in E} y_i y_j v^T f_{ij}(x)\right) \quad (11)$$

The partition function $\mathcal{Z}$ may be defined by:

$$\tilde{Z}(w, v, x) = \sum_y \exp\left(\sum_{i \in V} y_i w^T g_i(x) + \sum_{(i,j) \in E} y_i y_j v^T f_{ij}(x)\right) \quad (12)$$

The model of Equations (11) and (12) may be extended to situations with more than two labels by replacing the logistic sigmoid function with a softmax function as follows. First, a set of probabilities using the softmax may be defined as follows:

$$P(k) = \frac{\exp(w_k^T g_k(x))}{\sum_j \exp(w_j^T g_j(x))} \quad (13)$$

where the parameter k represents one of a plurality of the labels of the class. These may then be used to define the site and interaction potentials as follows:

$$A_i(y_i=k)=P(k) \quad (14)$$

$$I_{ij}(y_i=k, y_j=l)=\exp(v_{kl}^T f_{ij}) \quad (15)$$

where the variable l represents one of a plurality of labels of the class which may be the same as or different from the label k.

Conditional random fields may additionally or alternatively use asymmetric interaction features, leading to asymmetric interaction potentials. For a feature for the undirected edge (i,j), the features $f_{ij}(x)$ and $f_{ji}(x)$ may be calculated. These features may or may not be equal. For example if $f_{ij}(x)$ measures the relative distance between fragment i and j, then it is symmetric. But if $f_{ij}(x)$ measures whether i occurs temporally before j, then it is asymmetric. For another example of an asymmetric feature, consider a T-junction detector that fires when i='stem of the T-junction' and j='head of the T-junction', but not vice versa. In a traditional CRF, the parameters are implicitly symmetric $y_i y_j v$, which are invariant to exchanging i and j.

As an extension, the asymmetric conditional random field may be introduced employing asymmetric parameters $v(y_i, y_j)$ such that $v(y_i, y_j)$ may be different from $v(y_j, y_i)$. In this manner, asymmetric features may be taken advantage of where $f_{ij}(x)$ and $f_{ji}(x)$ may differ. This asymmetric conditional random field may be used to compute the probability of a labeling for the training model by:

$$P(y|x; q) = \frac{1}{Z(w, v, x)} \prod_{i \in V} \tilde{A}_i(y_i, x; w) \prod_{i,j \in E} \tilde{I}_{ij}(y_i, y_j, x; v) I_{ji}(y_j, y_i, x; v) \quad (16)$$

$$= \frac{1}{Z(w, v, x)} \prod_{i \in V} \tilde{A}_i(y_i, x; w) \prod_{i,j \in E} \exp(v(y_i, y_j)^T f_{ij}(x)) \exp(v(y_j, y_i)^T f_{ji}(x))$$

Training

The determined site features $g_i(x)$ of each node i and the determined interaction features $f_{ij}(x)$ of each edge connecting nodes i and j may be used to train 312 the training model 206 if the fragment data is training data 202 and the training labels 204 are known for each node. Training 312 the training model may be done in any suitable manner, such as by using a maximum likelihood approximation; Bayes Theorem such as those methods described in U.S. application Ser. No. 10/999,880, filed Nov. 30, 2004, which is incorporated herein by reference; and the like.

To determine labels and/or conditional distributions of the labels given observed data, such as the by the label predictor 222 of FIG. 2, the modeling parameters w and v may be trained or determined by the training data and training labels in the training engine. Specifically, the modeling parameters may be determined by determining the weights or importance of the associated feature. In one example, given a set of training data, the parameters $\theta=[w, v]$ may be found that maximize the conditional maximum a posteriori probability by using for example:

$$\hat{\theta} = \text{argmax}_\theta \log P(\theta|x, y) = \text{argmax}_\theta \log P(y|x, \theta) P(\theta) \quad (17)$$

Any suitable technique may be used to maximize the conditional maximum a posteriori probability of Equation (17) to determine the modeling parameters $\theta$ of the training model 206 of FIG. 2. In some cases, the technique to maximize the conditional maximum posteriori probability may depend on the type of non-linear $\psi$ function in the conditional distribution of labels given observed data.

In one example, the non-linear function $\psi$ may be implemented with an exponential function and independent Gaussian priors may be assigned to the modeling parameters, e.g., $P(\theta) = N(\theta; 0, \sigma^2 I)$ where $\sigma$ is the variance of the Gaussian and I is a diagonal matrix of ones. Using the Gaussian priors, for exponential nonlinearities and $\epsilon=0$, the term $\log P(y|x, \theta) P(\theta)$ of Equation (17) above may simplify to:

$$L = \log P(y|x, \theta) P(\theta) = \sum_{i \in V} y_i w^T g_i(x) + \sum_{(i,j) \in E} y_i y_j v^T f_{ij}(x) - \log Z(\theta) - \frac{\theta^2}{2\sigma^2} \quad (18)$$

The sums in Equation (18) are over all fragment nodes V and all fragment edges E, ranging over a plurality of training examples, such as a plurality of ink strokes which may form one or more diagrams, text, pages, documents, and the like.

To determine the modeling parameters $\theta$ of the training model 206 of FIG. 2, the training engine may maximize the log likelihood term L in any suitable manner such as by gradient descent via the Broyden-Fletcher-Goldfarb-Shanno (BFGS) quasi-Newton algorithm which is described further in chapter 8.8 of M Bazaraa, H Sherali, C Shetty "Nonlinear Programming", p. 325, Wiley 1993, which is incorporated by reference herein; other gradient descent algorithms; random search techniques; simulated annealing; and any other suitable optimization technique.

To implement gradient descent, the gradients with respect to w and v may be determined using for example:

$$\frac{dL}{dw} : \sum_{i \in V} (y_i - \langle y_i \rangle_{P(y|x,\theta)}) g_i(x) - \frac{w}{\sigma^2}, \quad (19)$$

$$\frac{dL}{dv} : \sum_{(i,j) \in E} (y_i y_j - \langle y_i y_j \rangle_{P(y|x,\theta)}) f_{ij}(x) - \frac{v}{\sigma^2},$$

where the angle brackets < > denote expectations with respect to the current model distribution and $\sigma$ denotes the variance of the Gaussian. Since only sums of single $y_i$ or pairs $y_i y_j$ occur in the expectations in Equation (19), only individual marginals $P(y_i|x, \theta)$ and pairwise marginals $P(y_i, y_j|x, \theta)$ may be required for computing expectations (which is computationally feasible, unlike expectations over the complete distribution $P(y|x, \theta)$ which is of exponential size).

For probit function nonlinearities with the label noise model of Equations (9) and (10) above, the gradient may have a similar form which may be represented as:

$$\frac{dL_\psi}{dw} : \sum_{i \in V} (q_i y_i - \langle q_i y_i \rangle_{P(y|x,\theta)}) g_i(x) - \frac{w}{\sigma^2}, \quad (20)$$

where $$q_i = \frac{N(y_i w^T g_i(x))}{\Psi(y_i w^T g_i(x)) + \frac{\epsilon}{1 - 2\epsilon}}$$

and a similar form may be generated for the gradient for the interaction parameters v.

For both exponential and probit nonlinearities, the log-likelihood is concave when the label error rate or noise $\epsilon=0$. In this manner, gradient ascent may be guaranteed to find a global maximum. In one example, a quasi-Newton technique BFGS may converge in approximately 50-100 iterations.

The computational cost of the log likelihood may be dominated by calculating the partition function $Z(\theta)$ and the marginals $P(y_i|x, \theta)$ and $P(y_i, y_j|x, \theta)$. In general, an exact calculation is exponential in the number of nodes in the graph. However, as noted above, the graphs may be sparsely connected. In this manner, a junction tree algorithm (also referred to as a sum-product algorithm) may be feasible on the triangulated graph. In some cases of graphs of ink stroke observed data, a tree may have a width typically less than 5, and may require around 5000 FLOPS to calculate a complete set of marginals and the partition function. For more densely connected graphs, approximate inference such as loopy belief propagation or any other suitable approximation may be used.

Alternatively, if the undirected graph is not sufficiently sparse, specifically if it has a high induced tree-width such as 10 or more, the conditional probability $p(y|x, w, v)$ may be approximated or determined in any suitable manner. In one example discussed below, the conditional probability may be approximated using the determined model parameters and a pseudo-likelihood approximation. In another example discussed below, the conditional probability for sparse trees may be exactly determined using the determined model parameters and junction tree algorithm.

In a pseudo-likelihood approximation, the conditional probability $p(y|x, w, v)$ may take the form:

$$p(y|x, w, v) \cong \prod_{i \in V} p(y_i|y_{E_i}, x, w, v) \quad (21)$$

where $y_{\epsilon i}$ denotes the set of label values $y_j$ which are neighbors directly connected to node i by an edge in the undirected graph. In this manner the joint conditional probability distribution is approximated by the product of the conditional probability distributions at each node. The individual conditional distributions which make up the pseudo-likelihood approximation may be written using the feature parameter vectors w and v, which may be concatenated into a parameter vector $\theta$. Moreover, the site vector $g_i(x)$ and interaction vector $f_{ij}(x)$ may be combined as a feature vector $\phi_i$ where $$\theta(y_{\epsilon i}, x) = [g_i(x), 2\Sigma y_j f_{ij}(x)] \quad (22)$$

Since the site and the interaction potentials may be sigmoidal up to a scaling factor, the pseudo-likelihood function $F(\theta)$ may be written as a product of sigmoidal functions:

$$F(\theta) = \prod_{n=1,i}^{N} \sigma(y_{in}\theta^T\phi_{in}) \quad (23)$$

Accordingly, learning algorithms may be applied to the pseudo-likelihood function of Equation (23) to determine the maximum a posteriori parameter vectors w and v, which may be used to develop a prediction model of the conditional probability of the labels given a set of observed data. The prediction model of the conditional probability of the labels given a set of observed data may be included in the training model 206 in any suitable manner such that it may be communicated to or accessed by the label predictor 222 for use in determining labels.

Figure 7:
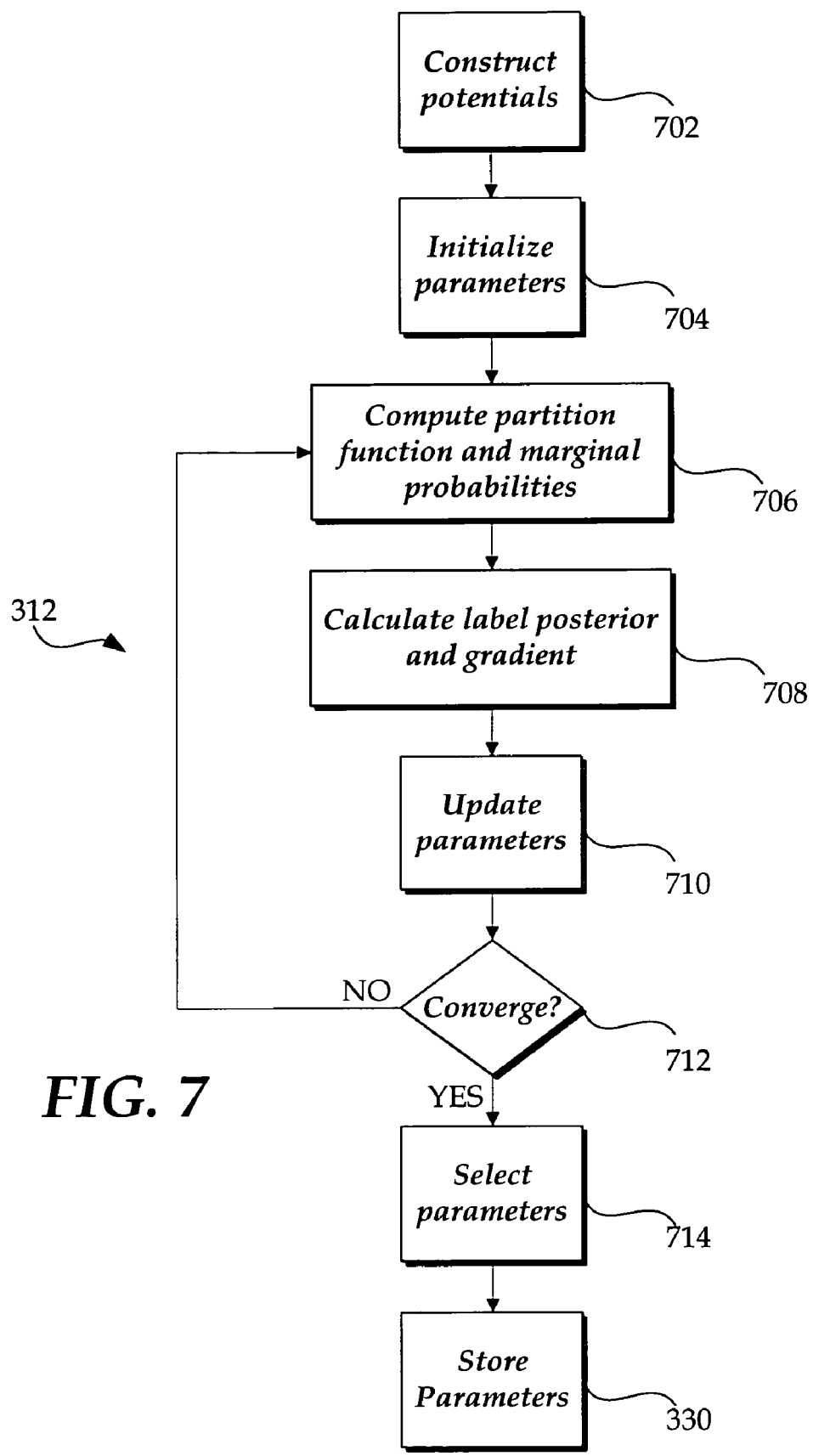
FIG. 7 is a flow chart of an example method of training the model of FIG. 3.

FIG. 7 illustrates an example method of training 312 the model of FIG. 3. The after the features are computed 308, 310, the potentials may be constructed 702. In training the modeling parameters, the potential are functions of the modeling parameters themselves. The site potentials may be constructed for each node and the interaction potentials may be constructed for each edge, forming a graph with potentials.

The modeling parameters $\theta$ may be initialized 704 in any suitable manner. The partition function and marginal probabilities of the labels may be computed 706 with the modeling parameters. The individual marginals may be computed for each node and the pairwise marginals may be computed for each edge. In this manner, each vertex and edge of the graph has a computed marginal.

The example method of FIG. 7 uses gradient descent to optimize the modeling parameters. Accordingly, the posterior of the labels given the training data P(y|x) and its gradient may be computed 708 from the marginals and partition function. The modeling parameters maybe updated 710 based on the gradient to increase the posterior probability P(y|x).

If the parameters have not converged, the method returns to computing 706 the partition function and marginal probabilities of the labels, using the updated modeling parameters. If the parameters have converged 712, the modeling parameters may be stored 714 in any suitable manner, such as in a data store of a computing device which may be accessed by the label predictor. It is to be appreciated that the example method of FIG. 7 may be modified in any suitable manner, such as to include triangulating the graph, using BFGS rather than a gradient descent, constructing a sparse graph to exactly compute the marginals, including cross-validation parameters of a cross-validation set to verify that the modeling parameters are optimized, and the like.

Prediction Labeling

If the labels for the features of the observed data are not known, then a developed training model may be used 314 to generate label probability distributions for the nodes of the observed data. With reference to FIGS. 2 and 3, the labeling system 200 may receive 302 observed data 212 to be labeled. The observed data 212 may be received, such as by the label predictor 222. The observed data may be formatted and/or modified as appropriate for use by the label predictor. For example, a drawing may be digitized.

The observed data 212 may be fragmented 304 using any suitable method, which may be application specific and may be done in a manner similar to or different from the fragmentation 304 discussed above with respect to the training data. Based upon the fragments of each item of ink strokes (e.g., document or page), a neighborhood, undirected graph for each item may be constructed 306 using any suitable method, such as that described above with respect to the training data.

One or more site features of each node of the observed data 212 may be computed 308, using the $g_i$ vector function developed in the training of the training model. One or more interaction features of each connection edge of the graph between pairwise nodes of the observed data 212 may be computed 310 using the interaction function $f_{ij}$ developed in the training of the training model. The training model 206 including the posterior distribution p(y|x, Y, X) may be used by the label predictor to determine a probability distribution of labels 214 for each fragment of each item in the observed data 212.

The labels y for the observed data x may be determined in any suitable manner. For example, given a model of the posterior distribution p(y|x,Y,X) from training data Y, X as p(y|x, w, v), the most likely labels may be determined as a specific solution for the set of y labels. In one approach, the most probable joint value $y^{MAP}$ and most probable marginal value $y^{MM}$ (or $y_i^{MM}$ for node i) may be represented as:

$$y^{MAP} = \mathrm{argmax}_y P(y|x, \theta) \quad (24)$$

$$y_i^{MM} = \mathrm{argmax}_{y_i} P(y_i|x, \theta), \forall i \in V. \quad (25)$$

Where the marginal probabilities of a node label $y_i$, i.e., $P(y_i|x, \theta)$ may be computed in any suitable manner, such as that described above.

The Maximum a posteriori (MAP) solution finds a globally compatible label assignment, whereas the maximum marginal (MM) solution may greedily choose the most likely individual labels, which may disagree with each other (even though they arise from a joint distribution). However, in a practical recognition scenario, the number of individually mislabeled segments may be desired to be minimized or reduced. In this manner, the MM criterion may be appropriate and may perform slightly better than MAP.

To find the MM solution, individual marginals $P(y_i|x, \theta)$ may be required, which in one method may be calculated exactly, using the junction tree algorithm, as done during training. The MAP solution can also be calculated exactly using the max-product algorithm applied to the junction tree. In both MM and MAP cases, approximation techniques may be necessary for dense graphs with loops., e.g. running loopy belief propagation in order to obtain an approximation to the site marginals. Graphs with loops are discussed further in Yair Weiss, "Correctness of local probability propagation in graphical models with loops," Neural Computation, vol. 12, 2000, pages 1-41, which is incorporated by reference herein.

When the number of nodes N is large, the optimal labelings y may be approximated by finding local optimal labelings, i.e., labelings where switching any single label in the label vector y may result in an overall labeling which is less likely. In one example, a local optimum may be found using iterated conditional modes (ICM), such as those described further in Besag, J. "On the Statistical Analysis of Dirty Picture," Journal of the Royal Statistical Society, B-48, 1986, pp. 259-302. In this manner, the most probable joint value $y^{MAP}$ may be initialized given training data Y,X. and the sites or nodes may be cycled through replacing each most likely label $\hat{y}_i$ with:

$$y_i = \arg\max_{y_i} p(y_i | y_{Ni}, x, Y, X) \quad (25)$$

In other approaches, a global maximum of labels y may be determined using graph cuts such as those described further in Kolmogorov et al., "What Energy Function Can be Minimized Via Graph Cuts?," IEEE Transactions on Pattern Analysis and Machine Intelligence, vol. 26, no. 2, 2004, pp. 147-159. In some cases, the global maximum using graph cuts may require that the interaction term be artificially constrained to be positive.

In yet other approaches, the global maximum of labels y may be determined by stochastic local search, such as that described in Frank Hutter, Holger H. Hoos, Thomas Stutzle "Efficient Stochastic Local Search for MPE Solving", International Joint Conference on Artificial Intelligence (IJCAI), 2005, p. 169-174, which is incorporated by reference herein.

Although the above examples are described with reference to a two label system (i.e., $y_i = \pm 1$), the expansion to more than two classes may allow the interaction energy to depend on all possible combinations of the class labels at adjacent sites i and j. A simpler model, however, may depend on whether the two class labels of nodes i and j were the same or different. An analogous model may then be built as described above and based on the softmax non-linearity instead of the exponential or logistic sigmoid.

When the labels y are determined 314 for the observed data x, the labels may be used in any suitable manner. For example, with reference to the method 300 of FIG. 3, one or more labels may be stored 316 in a data store associated with the corresponding observed data fragments. The labels and observed data may be stored in any suitable manner as described above. In some cases, the labels may be used by an application, such as the inking application or other application to modify 318 the display of the observed data, such as on a display device of the computing device of FIG. 1. For example, observed data may be generated within an inking application. The inking application may employ the label recognition, or alternatively, the inking data may be transferred to another application which may label the inked data. The labels may be used to convert the associated inked display into a display of predetermined objects corresponding to the determined labels and may also correspond to the appearance of the observed data, such as location, orientation, size, pen width, and the like. For example, an inked organizational chart may be modified to display an organizational chart which is formed of graphics application objects, such as aligned boxed and interactive connectors, based on the labeled fragments of the observed data. The display itself may be modified and/or the observed data may be deleted and replaced with the associated graphics application objects. It is to be appreciated that the labeled observed data may be manipulated and/or modified in any suitable manner as appropriate for the application.

Figure 8:
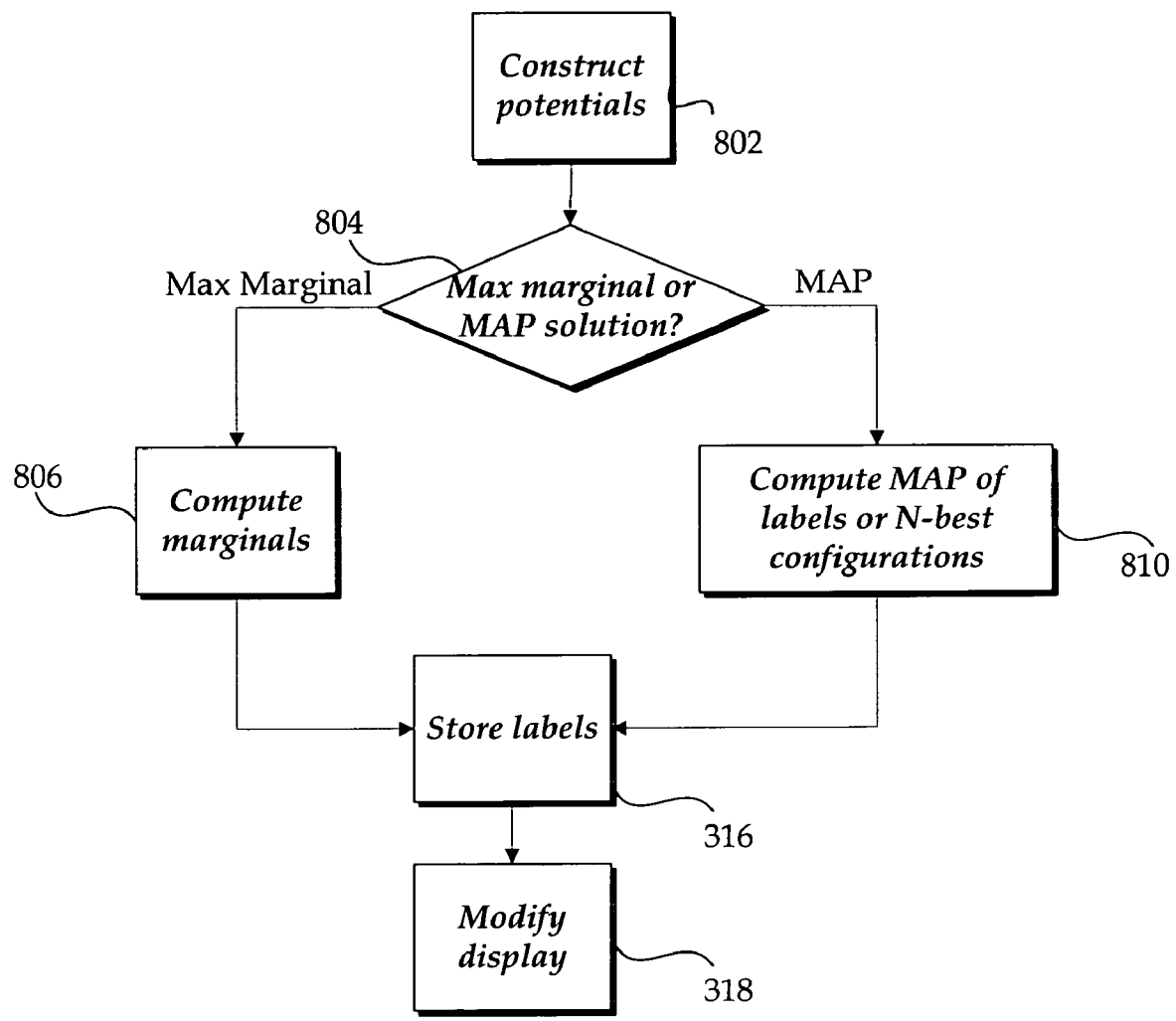
FIG. 8 is a flow chart of an example method of using the training model of FIG. 3.

FIG. 8 illustrates an example method 314 of using the training model as illustrated in FIG. 3. More particularly, after the observed data is fragmented 304, graph constructed 306, and features computed 308, 310, the potentials may be constructed 802. In using the modeling parameters, the potentials are functions of the labelings. The site potentials may be constructed for each node and the interaction potentials may be constructed for each edge, forming a graph with potentials.

A decision may be made 804 whether to determine an optimal local or global solution for the labels. The decision may be predetermined and may not be available as an interactive or determinable decision, as appropriate. If a local solution is to be determined, the marginal probabilities of the labels may be determined 806, which may provide an optimal labeling. If a global solution is to be determined, the MAP configuration of the labels or the N-best configurations may be computed 808 to provide the optimal labeling of the observed data.

With reference to FIG. 3, the determined labels for the associated observed data may be stored 316 and/or used to modify 318 a display of the observed data, as appropriate.

Compound Objects

Many diagrams made by one or more ink strokes contain compound objects with each object composed of one or more ink strokes. As noted above, the CRF recognition framework may be expanded to exploit parts of compound objects to improve recognition, while requiring training labels only for compound objects.

As an introductory illustration only, a hand-drawn diagram may include one or more objects such as containers and connectors, which are individually composed of compositional parts or individual ink strokes or portions of ink strokes. For example, a compositional part could be the side of a rectangle or the head of an arrow. A container may include four fragments, e.g., one for each side of the container. A compositional part may be produced as a fragment of a pen stroke, be a full pen stroke, or possibly comprise multiple strokes. Compositional parts may be combined in versatile ways to form compound objects such as tables, which have varying configurations of rows, columns, and cells; organizational charts, block letters, and the like. In other words, a small set of compositional parts can give rise to rich classes of objects. This compositional aspect of ink drawings suggests that recognition of objects may be facilitated by identification of compositional parts.

In some cases, some compositional parts may be similar and may only be recognized as an object when in a context proximate or in positional or temporal relation to other compositional objects. For example, a single line fragment may be the side of a container, or the stem of a connector, and its role (e.g., identification as a compositional part of an object) may be disambiguated by looking at the context of the single line fragment, e.g., position, orientation, and/or temporal creation of other fragments.

To exploit context in recognition, ink stroke compositional parts and relations between compositional parts may be modeled. For example, arrows may be recognized by decomposing them into arrow heads and arrow stems, and noting that they occur next to one another and/or point to sides of containers.

A learning framework that automatically discovers compositional parts may be used, and therefore may require only coarse-grained training labels for compound objects. In some cases, human labeling of training images may be reduced, as only larger objects including multiple fragments need to be manually labeled. In some cases, even if recognition of the compositional parts themselves is not desired, the compound object recognizers can become more accurate by modeling compositional parts automatically chosen for the recognition task. In some cases, the labeling system can also model rich classes that really are unions of distinct subcategories (not strictly compositional parts; e.g. modeling containers with subcategories box-container and oval-container), and which could not be captured by simpler models. In this case, each subcategory may be represented as a compositional part, since not all compositional parts may be required to be present in order to recognize a compound object. For example, each training fragment may be labeled as 'part of a container' (e.g., a rectangle, diamond, ellipse, and the like) or 'part of a connector' (e.g., line, arrow, and the like) as a binary label classification.

The labeling system 200 of FIG. 2 which automatically discovers compositional parts without fully labeled training data may be implemented using a conditional hidden random field (HRF). Conditional hidden random fields are discussed further in Kakade, "An Alternate Objective Function for Markovian Fields", Intl. Conf. Machine Learning (ICML), 2002, which is incorporated by reference herein. Conditional hidden random fields are an extension of a conditional random field (CRF) and a hidden Markov random field. Unlike a CRF, HRF also captures relations between unobserved ("hidden") variables, which may serve to identify compositional parts. These hidden variables also depend on features of the data (such as lengths and angles of pen strokes), and on observed labels.

A hidden random field may extend the conditional random field by introducing hidden variables h that may act as compositional part labels that are not observed during training. These hidden variables may provide extra modeling power, allowing the model to uncover an additional layer of structure not explicit in the observed labels. For example, the hidden variables may provide the training model with extra memory to propagate long-range interactions. In another example, the hidden variables may indicate compositional parts of compound objects.

Figure 5:
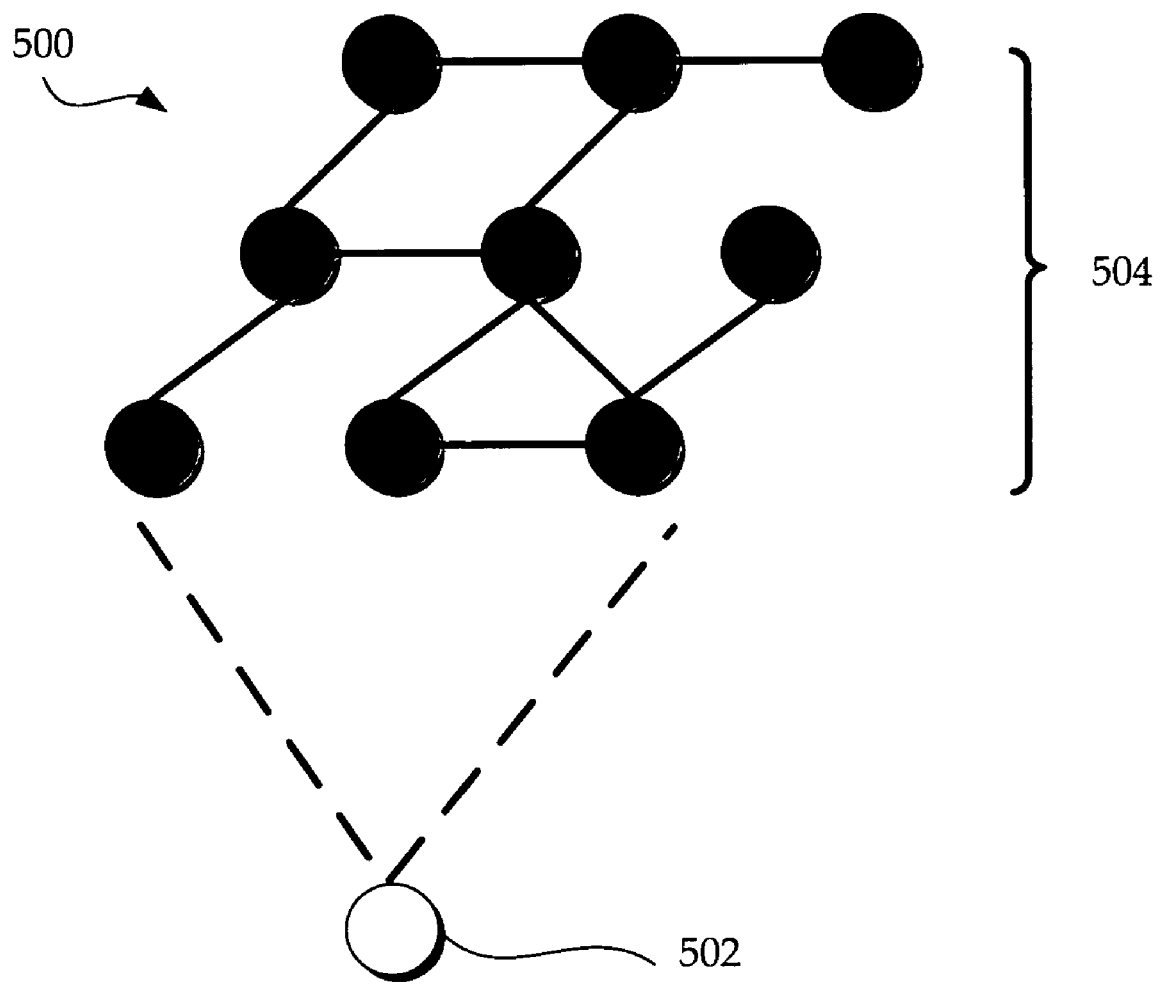
FIG. 5 is a diagram of an example conditional random field.
Figure 6:
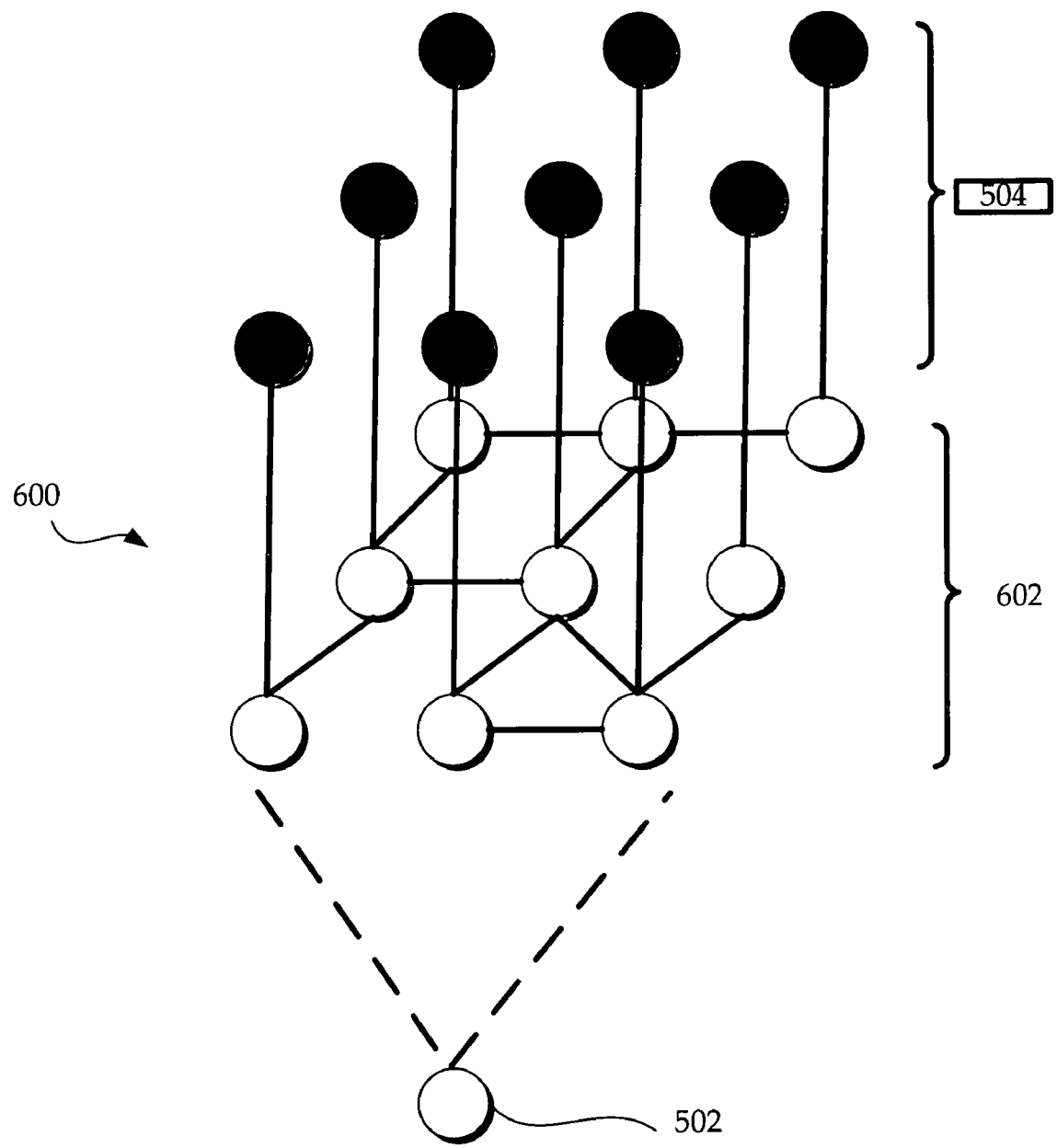
FIG. 6 is a diagram of an example hidden random field.

The HRF may be constructed similar to the CRF discussed above with reference to FIG. 3. With reference to the method 300 of FIG. 3, the training data may be received 302 and fragmented 304 as discussed above with respect to conditional random fields. To construct 306 the neighborhood graph, a hidden random field may be constructed rather than a conditional random field. An example conditional random field 500 is illustrated in FIG. 5 with training data fragments 502 associated with input training labels 504 which form the nodes of the graph and are connected with edges. An example hidden random field 600 is illustrated in FIG. 6 with the same training data fragments 502 associated with the input training labels 504, with each label being associated with a fragment of the training data. However, the neighborhood graph is constructed with a single hidden node (i.e., one of nodes 602) being associated with a single labeled fragment (i.e., one of nodes 504) with each hidden node (e.g., compositional part) being a node of the hidden random field which may be connected with edges. In this manner, each training fragment (e.g., node) has a training label, and each hidden node having an associated part label (e.g., fine grained label) that is learned or inferred by the hidden random field. With reference to the method of FIG. 3, the site features may be computed 308 for each fragment, the interaction features may be computed 310 for each connect fragments as for the CRF or in any other suitable manner.

During training 312 of the model, once a labeled node is observed or hypothesized, the hidden variable of the hidden node may be constrained to assume only compositional parts corresponding to that label. For example, an object label $y_i$ may be observed at each fragment site i, but the object may be assumed to include zero or more unknown parts $h_i$. Thus, a hidden random field may be constructed on the fragments. Each ink fragment may then be represented by a hidden node in the graph. For example, a pen stroke labeled as 'arrow' may specifically be an 'arrow stem' or 'arrow head' part. The HRF models dependencies between these compositional parts, e.g., an 'arrow head' may be more likely to occur next to an 'arrow stem' rather than another 'arrow head'. It is to be appreciated that a HRF with one part per class may be equivalent to a CRF.

For simplicity, the relationship between object labels and compositional parts may be fixed a priori. In particular, the number of compositional parts for each compound class may be specified, and in some cases, may not share compositional parts between classes. In other words, a compositional part variable h corresponding to a label y may be restricted to assume only a subset of values, so that h may uniquely determine y. This deterministic mapping from compositional parts to objects may be denoted by $y(h_i)$. For example, a box class may be assumed to include four parts.

The HRF model averages over the unobserved hidden variables. Mathematically, this may be represented as:

$$P(y|x, \theta) = \sum_h P(y, h|x, \theta) \qquad (26)$$

The joint model over the labels and hidden parts (y, h) may be similar to the CRF (with the labels $y_i$ exchanged for parts $h_i$) and may be represented as:

$$P(y, h|x, \theta) = \frac{1}{Z(\theta)} \prod_{i \in V} A_i(h_i, x; \theta) B_i(y_i, h_i; \theta) \prod_{(i,j) \in E} I_{i,j}(h_i, h_j, x; \theta) \qquad (27)$$

where the potentials may include any combination of potentials which may include any one or more of the site potential A described above, the interaction potential I described above, and a part-label interaction B which may be represented as:

$$\text{Site } A_i(y_i, x; \theta) = \exp(\theta^{(1)}(y_i)^T g_i(x)) \qquad (28)$$

$$\text{Interaction } I_{i,j}(y_i, y_j, x; \theta) = \exp(\theta^{(2)}(y_i, y_j)^T f_{ij}(x)) \qquad (29)$$

$$\text{Part-Label interaction } B_i(y_i, h_i; \theta) = \delta(y(h_i) = y_i) \qquad (30)$$

where $\delta(\cdot)$ is an indicator function.

The site and interaction potentials mirror those of the CRF before as described above with respect to Equations (4)-(10). The modeling parameters to be trained are $\theta^{(1)}(y_i)$ and $\theta^{(2)}(y_i, y_j)$, mirroring w and v of the CRF before. The HRF potential functions A and I quantify how compatible compositional parts are with the underlying ink and with neighboring compositional parts and labels. Each site potential refers to the compositional part $h_i$ of a particular fragment and its ink context. The context may be any subset of the set of ink strokes (e.g., diagram) x, but typically only neighboring fragments may be included. Interaction potentials model whether two compositional parts are compatible given pairwise contextual features.

The potentials, such as those of Equations (28)-(30) may then be substituted. In this manner, the probability which may be incorporated into the training model becomes:

$$P(y|x, \theta) = \frac{1}{Z(\theta)} \sum_h \left[ \exp\left(\sum_{i \in V} \theta^{(1)}(h_i)^T g_i(x)\right) \exp\left(\sum_{(i,j) \in E} \theta^{(2)}(h_i, h_j)^T f_{ij}(x)\right) \prod_{i \in V} \delta(y(h_i) = y_i) \right] \qquad (31)$$

The parameters θ of Equation (31) may be determined during training.

The HRF may be trained in any suitable manner. For example, the HRF may be trained by maximizing the conditional log likelihood L=log P(y|x, θ) of the training labels y, plus a Gaussian prior on the parameters P(θ)=N(θ; 0, σ²I). Since the assignments of the hidden parts h are not known, the values of the hidden parts may be inferred. Any suitable inference may be used for the hidden parts, such as the expectation maximization algorithm. Alternatively, the hidden parts may be trained via gradient ascent using the BFGS quasi-Newton. The gradients with respect to the parameters θ$^{(1)}$(h') and θ$^{(2)}$(h', h") may have simple forms and may be represented as:

$$\frac{dL}{d\theta^{(1)}(h')} = \sum_{i \in V} (P(h_i = h'|y, \theta) - P(h_i = h'|\theta)) g_i(x) \quad (32)$$

$$\frac{dL}{d\theta^{(2)}(h', h'')} = \sum_{(i,j) \in E} (P(h_i = h', h_j = h''|y, \theta) - P(h_i = h', h_j = h''|\theta)) f_{ij}(x). \quad (33)$$

The marginals $P(h_i=h'|y, \theta)$ and $P(h_i=h'|\theta)$ of Equations (32) and (33) may be calculated as during inference via the junction tree algorithm discussed above, as are the pairwise marginals for $h_i$, $h_j$.

Unlike the log likelihood function for a CRF, the log likelihood of an HRF is not convex, and may have local maxima. To find a good maximum, the likelihood may be constrained by training with a few labeled parts h. The parameter prior σ² may be important for reducing overfitting and may be chosen by cross-validation.

In some cases, the symmetric interaction features may be used so that $f_{ij}=f_{ji}$. In this case the interaction parameters will also be symmetric so that θ$^{(2)}$(h', h")=θ$^{(2)}$(h", h'). To further reduce the number of modeling parameters, parameters between hidden variables corresponding to different labels may be shared, such that θ$^{(2)}$(h', h")=θ$_{shared}$ when y(h')≠y(h"). In this case, all gradient contributions to shared parameters may be summed.

In some cases, to reduce the number of parameters, a redundancy in the site and interaction parameters may be removed. For example, the parameters θ$^{(1)}$(h$_i$) give an equivalent model to the parameters θ$^{(1)}$(h$_i$)−θ$^{(1)}$(1). In this manner, one or more parameters may be fixed such as θ$^{(1)}$(1)=0 and/or θ$^{(2)}$(1, 1)=0.

As with the CRF described with reference to FIG. 3, given the trained modeling parameters θ of Equation (31), the trained modeling parameters may be used to determine 314 or infer labels for observed data x. The labels for the observed data may be predicted in any suitable manner. For example, the labels for the observed data may be predicted by averaging out the hidden variables and all label variables but one, to calculate the maximum marginals which may be represented as:

$$y_i^{MM} = \text{argmax}_{y_i} P(y_i|x, \theta) = \text{argmax}_{y_i} \sum_{y|y_i} \sum_h P(y, h|x, \theta), \forall i \in V. \quad (34)$$

Alternatively, the most likely joint configuration of labels may be calculated by taking the argmax simultaneously over all the labels y. Although such configurations are globally consistent, the per-fragment error may be slightly worse. To see what compositional parts the algorithm has learned, the most likely compositional parts may be examined by determining:

$$h_i^{MM} = \text{argmax}_{h_i} P(h_i|x, \theta) = \text{argmax}_{h_i} \sum_y \sum_{h|h_i} P(y, h|x, \theta), \forall i \in V. \quad (35)$$

Both of Equations (34) and (35) require summing over a joint space of (y, h) of exponential size in the number of variables. Fortunately, because of the factorized structure of P(y, h|x, θ) and the assumed sparsity of interactions in the graph, the junction tree algorithm may be applied, or any of the approximate algorithms described above.

While the preferred embodiment of the invention has been illustrated and described, it will be appreciated that various changes can be made therein without departing from the spirit and scope of the invention.

The invention claimed is:

1. A method comprising steps performed by one or more processors, the steps comprising:
   a) fragmenting a set of at least one training ink stroke to form a plurality of fragments, at least two of the fragments forming a compound object represented by at least one of the training ink strokes;
   b) labeling each of the plurality of fragments with a single label, the label for each of the at least two of the fragments forming a compound object indicating a coarse label of the compound object;
   c) constructing a first neighborhood graph as a hidden random field comprising a plurality of nodes, a plurality of hidden nodes, and zero or more edges connecting two or more hidden nodes, each node of the first graph being associated with a single fragment, and at least one hidden node being associated with each node;
   d) constructing a site potential including at least a first portion of a set of modeling parameters, the site potential being based on at least one site feature for each hidden node;
   e) constructing an interaction potential including at least a second portion of the set of modeling parameters, the interaction potential being based on at least one interaction feature for each edge;
   f) constructing a part-label interaction potential including at least a third portion of the set of modeling parameters, the part-label interaction potential being based on at least one part-label interaction feature for each hidden node;
   g) optimizing the set of modeling parameters to increase a posterior conditional probability of the labels given the plurality of fragments based on the at least one site feature for each hidden node, the at least one interaction feature for each edge, and the at least one part-label interaction for each hidden node; and
   h) storing a training model including the set of modeling parameters in a computing device.

2. The method of claim 1, wherein optimizing includes determining a partition function and marginal probabilities of the labels at each hidden node and edge, determining the posterior conditional probability of the labels given the plurality of fragments, determining a gradient of the posterior probability, updating the set of modeling parameters to increase the posterior probability, and determining whether the updated set of modeling parameters have converged.

3. The method of claim 1, further comprising:
i) fragmenting a set of at least one observed ink stroke to form a plurality of observed fragments, at least two of the observed fragments forming an observed compound object;
j) constructing a second neighborhood graph as a hidden random field comprising a plurality of observed nodes, a plurality of observed hidden nodes, and zero or more observed edges connecting two or more observed hidden nodes, each observed node of the second graph being associated with a single observed fragment, and at least one observed hidden node being associated with each observed node;
i) determining the at least one site feature for each observed hidden node;
j) determining the at least one interaction feature for each observed edge;
k) determining the at least one part-label interaction feature for each observed hidden node; and
l) based on the at least one site feature, the at least one interaction feature, the at least one part-label interaction feature, and the set of modeling parameters, determining a label for each fragment of the plurality of observed fragments.

4. The method of claim 3, further comprising the one or more processors modifying a display of the at least one observed ink stroke based on at least one of the determined labels for each fragment.

5. The method of claim 1, wherein at least one interaction potential is asymmetric.

6. The method of claim 1, wherein the site potential and/or the interaction potential includes a labeling error rate.

7. The method of claim 1, wherein constructing a first neighborhood graph includes constructing a first neighborhood graph that is sparse.

8. The method of claim 7, wherein optimizing includes exactly determining a marginal probability at each node and exactly determining a partition function without approximation.

9. The method of claim 1, wherein constructing the first neighborhood graph includes generating a compositional part variable corresponding to a label, the compositional part variable being restricted to assume only a subset of values so that the compositional part variable uniquely determines the label.

10. The method of claim 9, wherein generating a compositional part variable includes inferring a value of the compositional part variable.

11. One or more computer readable storage media containing executable instructions that, when implemented, perform a method comprising:
a) receiving a set of data, the data comprising a set of one or more digital ink strokes;
b) fragmenting the set of data to form a plurality of fragments, each fragment being capable of being associated with a single label;
c) constructing a neighborhood graph comprising a plurality of nodes and one or more edges connecting two or more nodes, each node of the graph being associated with a single fragment;
d) determining at least one site feature for each node;
e) determining at least one interaction feature for each edge, at least one interaction feature being asymmetric;
f) determining a maximum a posterior configuration of a set of modeling parameters based on the at least one site feature, the at least one interaction feature, and a label for each node; and
g) storing the set of modeling parameters in a computing device.

12. The computer readable storage media of claim 11, wherein the set of modeling parameters includes a site modeling parameter, an interaction modeling parameter, and a part-label interaction modeling parameter.

13. The computer readable storage media of claim 11, further comprising determining a training model including the set of modeling parameters, the training model for providing the labels given a set of observed data.

14. The computer readable storage media of claim 13, further comprising predicting a distribution of labels for a fragment of an observed set of one or more ink strokes based on the training model.

15. The computer readable storage media of claim 14, wherein predicting includes locating a local optimum of labels for the fragment of the observed set of one or more ink strokes, determining a global maximum of the labels for the fragment of the observed data using graph cuts, determining a global maximum of the labels for the fragment of the observed data using a stochastic local search, or determining a global maximum of labels for the fragment of the observed set of one or more ink strokes using maximum a posteriori algorithms.

16. The computer readable storage media of claim 11, wherein determining a posterior distribution of the set of modeling parameters includes determining a site potential of each node including estimating a noise of the labels with a labeling error rate variable, and determining an interaction potential between connected nodes including estimating a noise of the labels with the labeling error rate variable.

17. The computer readable storage media of claim 11, further comprising generating a training model for providing a distribution of labels given a set of observed data and including the set of modeling parameters, and predicting a label for each fragment of an observed set of one or more ink strokes based on the training model.

18. A system for predicting a label for a fragment of an observed set of one or more ink strokes, the system comprising:
a) a database;
b) a memory in which machine instructions are stored; and
c) a processor that is coupled to the database and the memory, the processor executing the machine instructions to carry out a plurality of functions, comprising:
i) receiving a set of one or more observed ink strokes;
ii) fragmenting a set of at least one training ink stroke to form a plurality of fragments, at least two of the fragments forming a compound object represented by at least one of the training ink strokes, at least two of the fragments forming a compound object represented by the one or more observed ink strokes;
iii) constructing a neighborhood graph as a hidden random field comprising a plurality of nodes, a plurality of hidden nodes, and zero or more edges connecting two or more hidden nodes, each node of the graph being associated with a single fragment, and at least one hidden node being associated with each node;
iv) determining a site potential based on at least a first portion of a set of trained modeling parameters and at least one site feature for each hidden node;
v) determining an interaction potential based on a second portion of the set of trained modeling parameters and at least one asymmetric interaction feature for each edge;

vi) constructing a part-label interaction potential based on a third portion of the set of trained modeling parameters and at least one part-label interaction feature for each hidden node;

vii) determining a label for each fragment based on the site potential, the interaction potential, and the part-label potential; and viii) storing in the database at least one of the labels associated with the corresponding fragment.

19. The system of claim 18, further comprising a display device, the plurality of functions further comprising modifying a display of the set of one or more observed ink strokes based on at least one of the determined labels.

20. The system of claim 18, wherein constructing the neighborhood graph includes generating a sparse neighborhood graph and wherein determining a label for each fragment includes exactly determining a marginal probability at each hidden node and exactly determining a partition function without approximation.

* * * * *